United States Patent [19]
Dixon, Jr.

[11] Patent Number: 5,378,552
[45] Date of Patent: Jan. 3, 1995

[54] MODULAR BATTERY SYSTEM COMPRISING INDIVIDUAL INTERCONNECTED MODULES

[76] Inventor: Alfred R. Dixon, Jr., 4023 Far Hill, Bloomfield Hills, Mich. 48304

[21] Appl. No.: 213,955

[22] Filed: Mar. 16, 1994

[51] Int. Cl.⁶ ............................................. H01M 2/24
[52] U.S. Cl. ..................................... 429/91; 429/123; 429/158; 429/1
[58] Field of Search ....................... 429/90, 91, 96, 97, 429/99, 121, 123, 156, 157, 158, 159, 160, 1, 178, 179; 439/366, 500, 504, 505, 628; 320/17, 34, 35, 40, 48, 49; 340/636, 644

[56] References Cited

U.S. PATENT DOCUMENTS

| | | |
|---|---|---|
| 4,291,106 | 9/1981 | Hooke ........................ 429/1 |
| 4,576,880 | 3/1986 | Verdier et al. . |
| 4,581,306 | 4/1986 | Hasenauer et al. ............... 429/123 |
| 4,622,274 | 11/1986 | Lowrance . |
| 4,657,335 | 4/1987 | Koch et al. . |
| 4,734,063 | 3/1988 | Koch et al. . |
| 4,957,829 | 9/1990 | Holl ........................ 429/99 |
| 5,104,752 | 4/1992 | Baughman et al. . |

*Primary Examiner*—Anthony Skapars
*Attorney, Agent, or Firm*—Basile and Hanlon

[57] ABSTRACT

A battery includes a case with two pairs of connectors mounted on exterior walls. One pair of connectors are connected to electroactive material within the case to form positive and negative electrodes. The other pair of connectors are interconnected by an insulated electrical conductor extending through the case. A jumper interconnects one connector of each pair of connectors to form a series electrical path through the interconnected modules. Separate connectors are complimentarily-shaped to the connectors in the case for releasably interconnecting a plurality of like modules together. The separate connectors may be mounted in a single planar carrier insertable between two adjacent modules. The carrier has guide members formed thereon to facilitate the alignment and positioning of adjacent modules with respect to each other. A voltage tap may be mounted on one of the separate connectors to provide an external voltage monitoring tap between interconnected modules. A thermocouple may be mounted on the carrier for sensing the temperature of the case of an adjacent module.

38 Claims, 4 Drawing Sheets

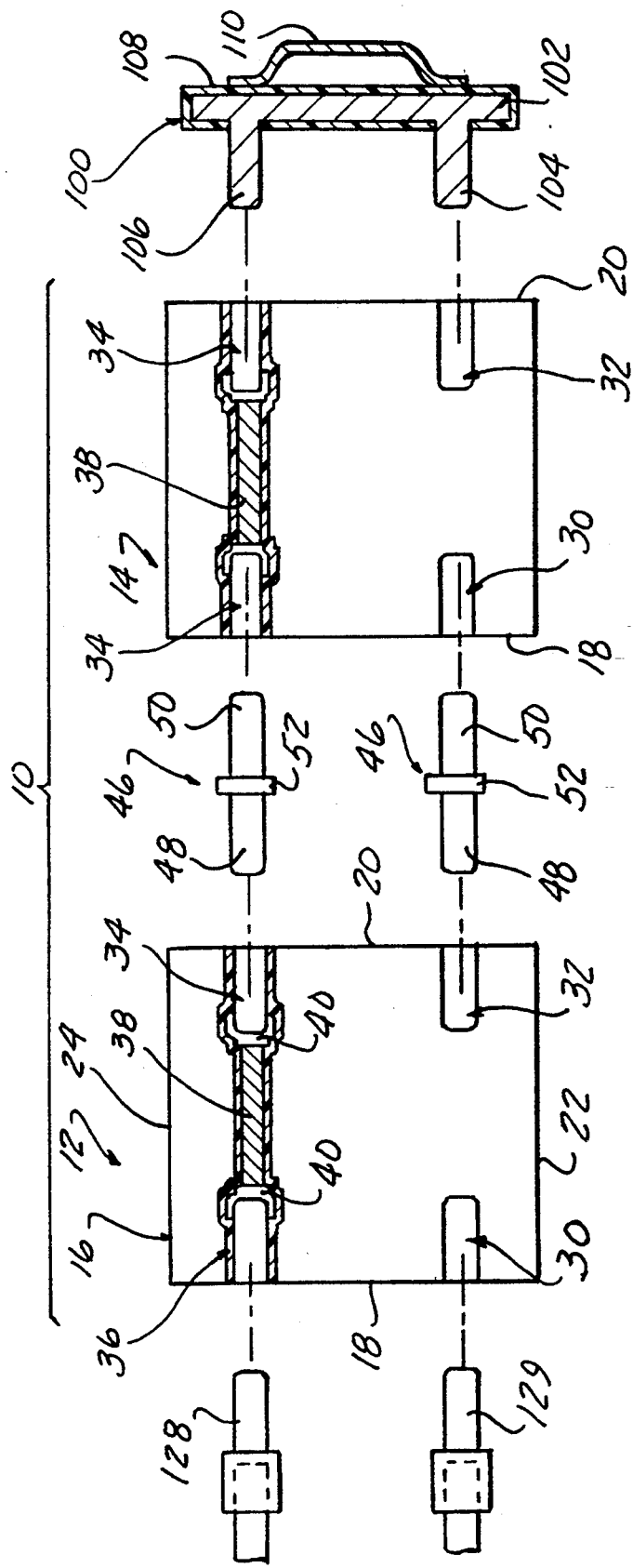
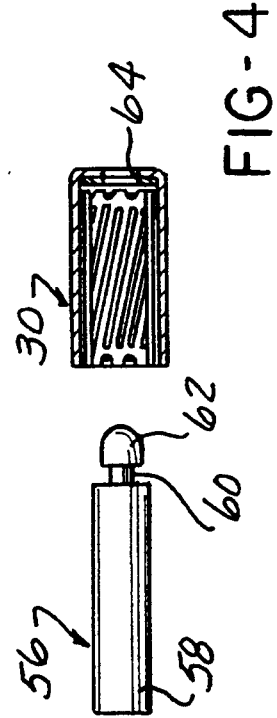
FIG-1
FIG-4

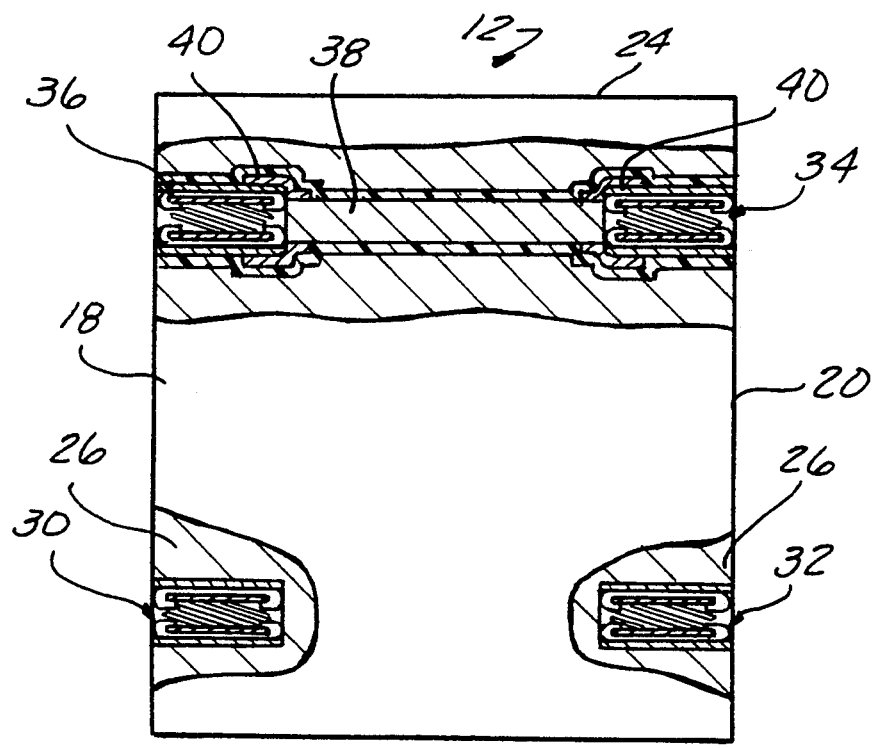
FIG-2
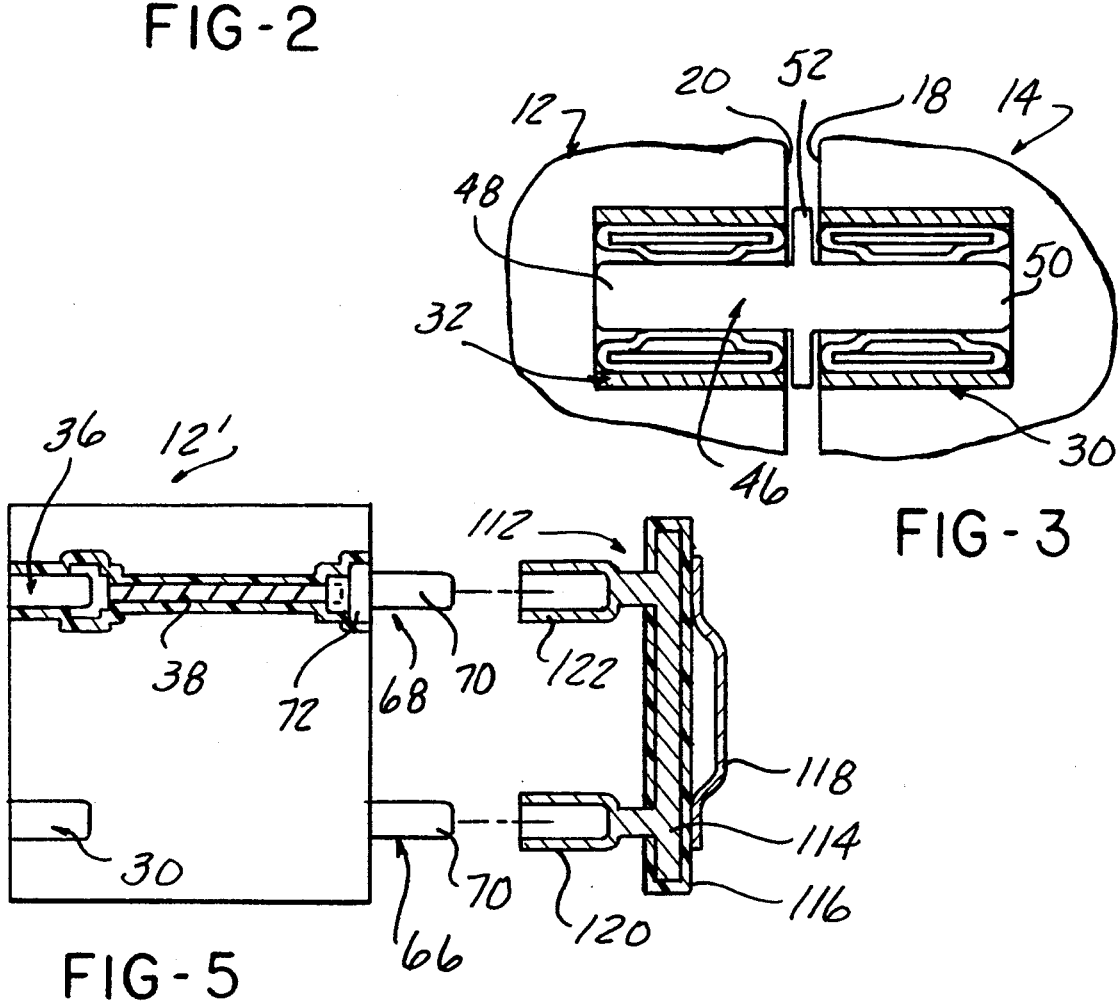
FIG-3
FIG-5

MODULAR BATTERY SYSTEM COMPRISING INDIVIDUAL INTERCONNECTED MODULES

BACKGROUND OF THE INVENTION

1. Field of the Invention

The present invention relates, in general, to batteries and, specifically, to batteries formed of interconnected modules and, more specifically, batteries for electric-powered vehicles.

2. Description of the Art

Small, cylindrical battery cells used for electrical appliances, radios, flashlights, etc., are typically formed with one positive electrode at one end and a negative electrode at the other end. A plurality of cells can be arranged and connected end-to-end in series to obtain the desired voltage to power an electrical appliance or device. Due to size constraints or in the event that a large number of battery cells are needed to provide the required electrical power, it is common for a plurality of battery cells to be arranged in series, with the individual cells disposed end-to-end and possibly side-by-side. A bridging contact extends between the endmost side-by-side arranged cells to connect such cells in series. Electrical contacts or leads are connected to the opposite ends of the series connected cells to provide electric power to the device.

Larger batteries typically used in automotive vehicles have two exposed electrodes or terminals which extend outward from one side of the battery case. Battery cables are attached to the electrodes to supply power to the vehicle electrical system.

In electrically-powered vehicles, a large number of such batteries are required to provide the desired electrical power requirements of 200–700 volts and 200–300 amps. Such batteries are in the form of individual modules, each having a pair of exposed electrodes or terminals extending outward from each module case. The modules are arranged in-line and possibly side-by-side to form a tub or complete battery. Large, heavy electrical cables with appropriate end connectors are used to interconnect the electrodes on each module to the electrodes on an adjacent module to connect the individual modules in series.

In such an arrangement, the use of a number of separate battery cables or conductors to interconnect a plurality of modules is a time consuming process.

Thus, it would be desirable to provide a battery construction which enables multiple batteries or battery modules to be easily interconnected together to form a complete battery. It would also be desirable to provide a battery construction for interconnecting a plurality of individual battery modules together which minimizes the possibility of short circuits between the electrodes of the modules. It would also be desirable to provide a battery construction which enables easy and safe interconnection and disconnection of multiple battery modules. It would also be desirable to provide a battery construction for interconnecting multiple battery modules together which minimizes conductive surface exposure to reduce the occurrence of short circuits or damage to such conductive surfaces. Finally, it would be desirable to provide a battery construction for interconnecting multiple battery modules together which decouples vibration between adjacent, interconnected batteries.

SUMMARY OF THE INVENTION

The present invention is a battery formed of individual, interconnected modules.

In one embodiment, the battery includes:

a case formed of exterior walls which contains electroactive material. A first positive electrode is mounted in one exterior wall of the case and is electrically connected to the electroactive material in the case. A second negative electrode is mounted in an external wall of the case and is electrically connected to the electroactive material in the case. A conductor means is mounted in the case and extends between external walls of the case for forming a conductive path through the case. Third and fourth connectors are mounted on opposite ends of the conductor means. Jumper means is insertable into the third connector and the second electrode for electrically connecting the second electrode through the conductor means in the case to the fourth connector.

Separate connectors, formed complementary the first and second electrodes and the third and fourth connectors are insertable into such electrodes and connectors to join two like batteries end-to-end in series connection. Two or more series connected batteries may also be arranged side-by-side with a similar arrangement of series connected batteries, with the rows of series connected batteries likewise connected in series or parallel by suitably formed jumper means.

Preferably, the first and second electrodes are also formed as connectors, but are connected to the electroactive material in the case. All of the connectors mounted on the case may be of either a female or male type, with the separate connectors used to interconnect adjacent batteries or modules together being of a complimentary male or female type.

In an alternate embodiment, the separate connectors may be mounted on a planar carrier to facilitate the mounting of the connectors between two adjacent battery modules. Guide means may be formed on the carrier to align and position adjacent battery modules together as well as to absorb vibration and prevent sideways movement of two adjacent interconnected battery modules with respect to each other.

A battery voltage tap having a male spade top connector may be mounted on at least one of separate connectors inserted between the electrodes and connectors of two adjacent modules, with the spade connector extending above the surface of the modules to provide a battery voltage monitoring point. The voltage tap may also be mounted on or integrally formed in the carrier.

A thermocouple may also be mounted in the carrier so as to contact the adjacent surface of a battery module and provide a battery temperature sensor which is particularly suited for heavy use or charging of the batteries.

The unique battery of the present invention provides significant advantages which make it ideal for use as a power source in electrically-powered motor vehicles. The second electrode/third connector pair in each module and the separate jumper means enables a number of like modules to be interconnected without a conductive path being formed between the positive and negative electrodes of such batteries which would create the exposure of live potential to the installer. The series circuit through the interconnected modules is completed only by insertion of the jumper means into the endmost module thereby providing the assembler with control over the power delivered from the battery.

The jumper means may be uniquely provided with overload protective devices, such as fuses, circuit breakers, etc., to provide further safety in use of the battery in the present invention.

BRIEF DESCRIPTION OF THE DRAWING

The various features, advantages and other uses of the present invention will become more apparent by referring to the following detailed description and drawing in which:

FIG. 1 is an exploded, plan view of a battery formed of interconnected modules constructed in accordance with the teachings of the present invention;

FIG. 2 is an enlarged, partially cross sectioned view of one of the battery modules shown in FIG. 1;

FIG. 3 is an enlarged, partially cross sectioned, plan view showing the interconnection of two modules according to the present invention;

FIG. 4 is an exploded, partially cross sectioned view showing an alternate connector arrangement;

FIG. 5 is an exploded, partially cross sectioned, plan view showing an alternate jumper means;

DESCRIPTION OF THE PREFERRED EMBODIMENTS

Figure 6:
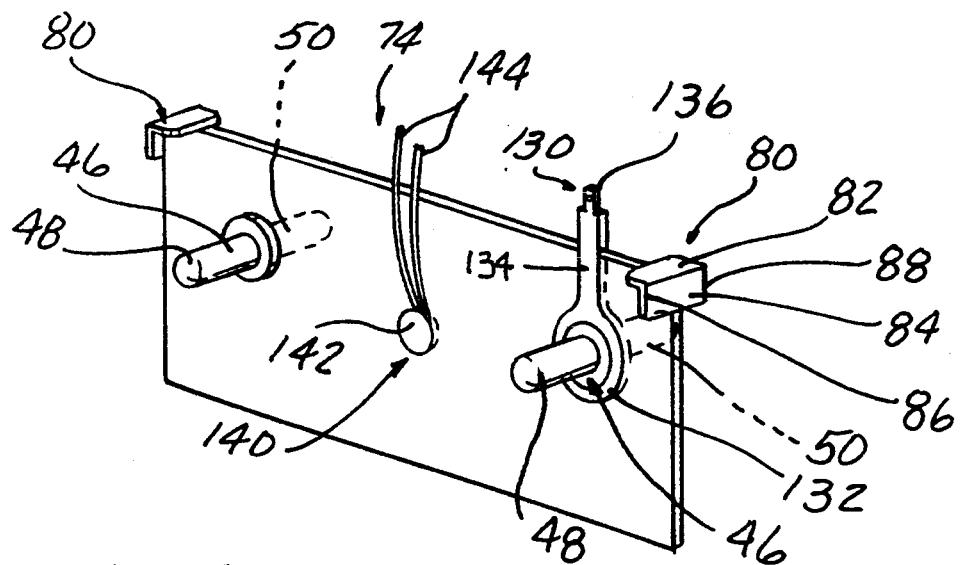
FIG. 6 is a perspective view of a carrier used in one embodiment of the present invention.

Referring now to FIG. 1, there is depicted a battery 10 which is formed of a plurality of individual battery modules 12 and 14. It will be understood that although only two modules 12 and 14 are depicted, the battery 10 may be formed of any number of individual modules, including only a single module, such as module 12. Further, the teachings of the present invention are applicable to any battery or battery module type and to diverse applications for batteries, such as uninterruptable power supplies and power load leveling banks, even though the following description will be provided with reference to the use of such battery modules 12 and 14 in constructing a battery 10 for use in an electrically-powered motor vehicle. In such an application, a number of modules 12, 14, etc., are interconnected to provide electrical power of typically 200 V–700 V and 200–300 amps. Such modules 12 and 14 may be connected in-line, as shown in FIG. 1, as well as side-by-side.

As shown in FIG. 1, each module 12, 14, etc., is substantially identically constructed such that the following description will be provided with reference only to battery module 12. The module 12 is formed of a conventional case 16 which has a plurality of exterior walls, such as side walls 18, 20, 22 and 24 and opposed top and bottom walls, not shown. The case 16 is preferably formed of an electrically insulating material. As shown in FIG. 2, an electroactive material or materials 26 are disposed within the sealed case 16 of the module 12 and provide electric power in a known manner. As any electroactive material 26 may be used, and, further, since such electroactive material does not form a part of the present invention, further details concerning such electroactive material will not be described herein.

The module 12 is provided with first and second electrodes 30 and 32, respectively, which are mounted in certain of the exterior walls of the case 16, such as the opposed side walls 18 and 20, as shown in FIGS. 1 and 2. The first and second electrodes 30 and 32 are fixedly mounted in the case 16 by suitable means, such as by molding etc.

The first and second electrodes 30 and 32 are preferably formed of an electrical socket, sometimes referred to as a barrel terminal, to provide both electrode and electrical connector functions. In barrel terminals, conductor strips or wires are stretched and extend through the interior of a cylindrical sleeve from a first circumferential location at one end of the sleeve to a second circumferential location at the opposite end of the sleeve which is angularly displaced about the sleeve axis from the first circumferential location. A plurality of such strips so mounted within a cylindrical sleeve collectively lie on a surface of revolution of a general hourglass shape whose diameter varies from a minimum diameter midway between the ends of the sleeve and a maximum diameter at each end of the sleeve. When a cylindrical electric contact of a diameter intermediate the minimum and maximum diameters referred to above is inserted into such a barrel terminal, the conductor strips will collectively exert a radially resilient grip on the contact. This type of barrel terminal and a method for making the barrel terminal is disclose in U.S. Pat. Nos. 4,657,335 and 4,734,063. Commercially available connectors suitable for use in the present invention are sold under the names of Hypertronics' Hypertrac, Elcon Helix, Elcon Crown or RADSOK ®. Other commercially available connectors suitable for use in the present invention do not use angularly displaced wires, instead these connectors use parallel wires that have been bent or forced concave by a circumferential spring. Such a barrel terminal with parallel wires is sold under the name of O.D.U. Springtac ™ and Compliant Conductive Connections CCC ™ contact.

Each of the first and second electrodes 30 and 32 is suitably connected to the electroactive material 26 in the casing 16, such as to the plates employed in conventional battery. In this manner, the first electrode 30 forms a positive electrode and the second electrode 32 is a negative electrode on the module 12.

It should be noted that the first and second electrodes 30 and 32 may be mounted on any of the exterior walls of the case 16 as well as in any position on such walls. Preferably, however, the first and second electrodes 30 and 32 are disposed on opposite side walls 18 and 20 and are arranged co-axially with each other to permit easy interconnection of identical modules 12, 14, etc., together.

A second pair of electrodes or connectors forming a third electrode 34 and a fourth electrode 36 are also mounted in the case 16 of the module 12. The third and fourth electrodes 34 and 36 are electrically insulated from the electroactive material 26 within the case 16 and are of the same barrel terminal construction as the first and second electrodes 30 and 32. Rather, the third and fourth electrodes 34 and 36 form a bypass connection through the module 12, as described in greater detail hereafter.

The third and fourth electrodes 34 and 36 are preferably disposed on the same exterior walls 18 and 20 as the first and second electrodes 30 and 32, respectively. Further, the third and fourth electrodes 34 and 36 are also preferably co-axially aligned with each other and laterally spaced from the first and second electrodes 30 and 32, as shown in FIGS. 1 and 2.

Each of the electrodes 30, 32, 34 and 36 may be formed in either a male or female configuration. A female configuration is preferred since it provides a small exposed surface area thereby minimizing exposure to short circuits and damage during installation, storage, etc.

An insulated electrical conductor 38 is joined to and extends between the third and fourth electrodes 34 and 36 within the case 16. Suitable end connectors 40 and 42 are employed to electrically attach the ends of the conductor 38 to the third and fourth electrodes 34 and 36, as shown in FIG. 1.

The battery 10 of the present invention also includes a connector means for interconnecting a plurality of like modules 12, 14, etc., together in series. A first embodiment of a connector means is shown in FIGS. 1 and 3 and is denoted by reference number 46. With the female-type electrodes 30, 32, 34 and 36 employed in a preferred embodiment of the module 12 shown in FIG. 1, the connector 46 is in the form of a double-ended connector having first and second, co-axial, oppositely extending male pins 48 and 50. Each of the male pins 48 and 50 has a generally smooth sided, cylindrical form of a diameter adapted to slidably fit within and securely engage the contact surfaces within each barrel terminal used to form the electrodes 30, 32, 34 and 36. In this embodiment, the male pins 48 and 50 engage the electrodes 30, 32, 34 and 36 of two adjacent modules 12 and 14 in a secure press fit, which provides electrical contact between each connector 46 and the two electrodes engaged thereby, while still enabling easy separation of the modules 12 and 14 from each other as well as a disengagement of the connector 46 from both modules 12 and 14. An enlarged diameter annular collar 52 is formed on the connector 46 between the pins 48 and 50 to facilitate handling of the connector 46.

The use of a barrel terminal or the connectors 30, 32, 34 and 36 also provides vibration de-coupling between two adjacent modules 12 and 14 when interconnected by the connectors 46 as shown in FIG. 2. The hourglass or hyperbolic shape of the strips in the barrel terminal flexes to absorb vibration of each individual vibration to the adjacent module or stressing the connectors 46.

An alternate connector usable in the present invention is shown in FIG. 4. In this embodiment, the connector 56 comprises a male pin 58 having a reduced diameter neck 60 at one end and an enlarged, generally mushroom-shaped head 62. The connector 56 is adapted to slidably engage a conventional barrel terminal, such as the barrel terminal used to form the first electrode 30, and is inserted therein to a sufficient depth to bring the neck 60 into engagement with a spring washer 64 mounted at one end of the barrel terminal 30. This securely mounts the connector 56 in the barrel terminal in a snap-in fit, while still enabling easy release of the connector 56 from the terminal.

Alternately, each battery module, such as battery module 12' shown in FIG. 5, may be provided with electrodes in the form of outwardly extending, male-type terminals. All of the electrodes on the module 12' may be of the male type or a combination of male and female electrodes may be used, as specifically depicted in FIG. 5. In this alternate embodiment, the first and fourth electrodes 30 and 36 are formed of female-type barrel terminals, as described above and shown in FIG. 1. The second electrode 66 as well as the third electrode 68 are in the form of a male pin having an outwardly extending pin end 70 and a base 72 which is fixedly mounted in the case 16 of the module 12. The third electrode 68 is connected by the internal conductor 38 to the fourth electrode 36 in the same manner as described above in the embodiment depicted in FIGS. 1 and 2.

With this alternate embodiment, a different connector which has complimentarily-shaped connectors thereon is employed to mate with the male-shaped electrodes 66 and 68 on the module 12. Such a connector, although not shown, may have a pair of female-type barrel terminals or sockets, similar to that shown in FIG. 5, for matingly engaging the pin shaped electrodes 66 and 68 on the module 12'. The opposite side of such a connector would have male pins, such as male pins 50 shown on the connector 46 in FIG. 1, for securely engaging the female-type electrodes 30 and 36 in an adjacent battery module 14.

In another embodiment, either the double-ended male pins 48 and 50 or a combination of female socket and male pin may be mounted in a suitably formed carrier denoted by reference number 74 and shown in FIG. 6. The carrier 74 is preferably formed of an electrically insulating material, such as plastic, rubber, etc. The carrier 74 has a generally planar shape with the connectors 46 mounted therein in a suitable position to releasably engage aligned electrodes in two adjacent disposed battery modules 12 and 14. It will also be understood that the connectors mounted in the carrier 74 may also comprise female/female connectors or a combination of female/male connectors.

Figure 7:
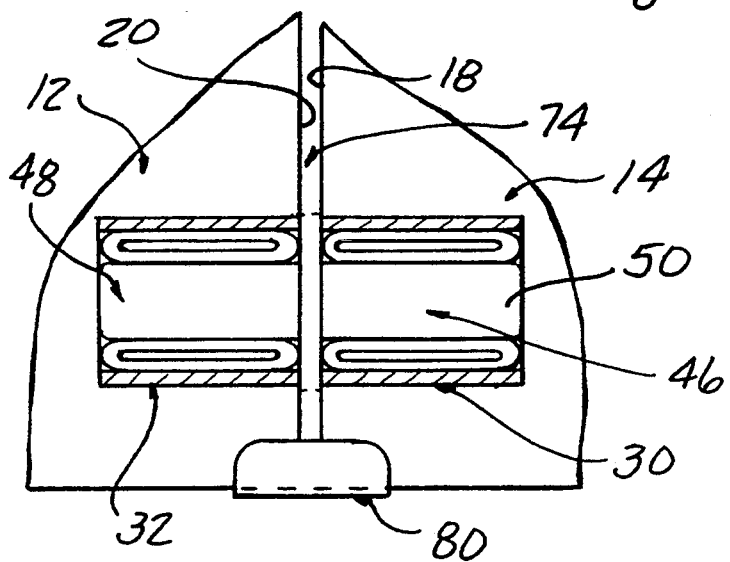
FIG. 7 is a partially cross sectioned, plan view showing the use of the carrier depicted in FIG. 6 in interconnecting two adjacent battery modules together.

As also shown in FIGS. 6 and 7, the carrier 74 is provided with guide means for guiding the mounting of the carrier 74 on a battery module 12, 14, etc., as well as guiding and aligning two adjacent modules 12 and 14 in a co-axial arrangement. The guide means, denoted generally by reference number 80 may take any suitable form. By way of example only, the guide means 80 comprises a generally L-shaped tab formed of a first leg 82 and a second, generally perpendicular leg 84. The tab 82 is mounted on an upper edge of the carrier 74 by suitable means, such as by bonding, or by integral formation with the planar portion of the carrier 74. Outer ends 86 and 88 of the guide tab 80 extend outward beyond the adjacent surface of the carrier 74 and form a guide surface which slidably receives an upper edge of a battery module 12, 14, etc.

It will be understood that the guide means 80 may take other forms, such as projections formed on and extending outward from opposite sides of the carrier 74 which engage suitably formed slots, bores or recesses in the exterior surface of the case 16 of each of the modules 12, 14, etc.

In addition to guiding and aligning two adjacent battery modules 12 and 14 together, the carrier 74 also functions to properly align the modules 12 and 14 for easy slidable insertion and connection of the connectors 46 in one battery module 12 into module 14. In addition, the guide means or tabs 80 on the carrier 74 provides a somewhat rigid surface between two aligned, interconnected modules 12 and 14. This rigid surface minimizes sideways movement of one module with respect to an adjacent module and minimizes any stress buildup on the connectors 46 extending between the modules 12 and 14.

Figure 8:
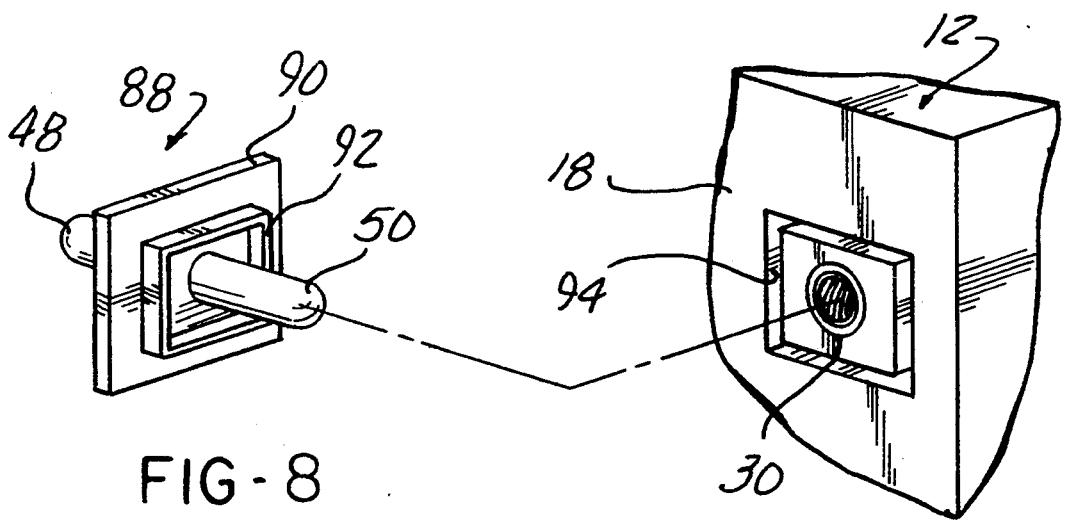
FIG. 8 is an exploded, perspective view showing an alternate connector according to the present invention.

FIG. 8 depicts another embodiment of a guide means 88 which is used on the individual connectors 46. In this embodiment, the connector 46 is formed in the same manner as described above and shown in FIG. 1 with outwardly extending male pins 48 and 50. An annular collar 90 is formed between and extends radially outward from the axis of the pins 48 and 50. A projection 92, such as the exemplary square-shaped projection shown in FIG. 8, is mounted on one and preferably both major sides of the collar 90 and surrounds an end portion of the corresponding pin 48 or 50. The projection 92 engages a complimentarily-shaped recess 94 formed in an exterior wall, such as side wall 18 of each battery module, such as battery module 12. The recess 94 surrounds each electrode, such as electrode 30, shown by example in FIG. 8. In this manner, insertion of the connector 88 into aligned electrodes 30 and 32 of two adjacent disposed battery modules 12 and 14 results in the engagement of the projections 92 extending outward from opposite sides of the collar 90 on the connector 88 into recesses 94 formed in each of the adjacent battery modules 12 and 14 to securely lock the battery modules 12 and 14 in an axial alignment which resists sideways movement between the modules 12 and 14.

Referring again to FIG. 1, the battery 10 of the present invention also includes a bridge strap or jumper means denoted generally by reference number 100. The bridge strap 100, in a first embodiment, includes a bar or conductor 102 formed of an electrically conductive material. For the female-type electrode shown in the embodiment depicted in FIG. 1, the bridge strap 100 is formed with complimentarily-shaped cylindrical, male pins 104 and 106, which are fixedly joined to or integrally formed with the bar 102 and extend outward therefrom. The pins 104 and 106 have a length to fully engage the respective electrodes 32 and 34 in one of the modules, such as module 14 shown in FIG. 1.

The bridge strap 100 also includes a suitable covering 108 of an electrically insulating material. In addition, a handle 110 of any suitable shape is mounted to and insulated from the rod 102 to facilitate insertion and removal of the bridge strap 100 into and out of one of the battery modules 12 or 14.

An alternate embodiment of a bridge strap 112 is depicted in FIG. 5. The bridge strap 112 also includes a conductive bar or rod 114, an insulating coating 116 and a handle 118. However, in this embodiment, a pair of female-type sockets or terminals 120 and 122 are mounted on or integrally formed with and extend outward from the conductive rod 114. The female terminals 120 and 122 are sized to releasably engage the male pins 70 forming the electrodes in the embodiment shown in FIG. 5.

In both versions, the bridge strap 100 or 112 functions in the same manner to provide a conductive path between the second electrode 32 and the adjacent third electrode 34 on a battery module. Since the third electrode 34 is connected to the fourth electrode 36 by the conductor 38 extending through the case 16 of each module 12, 14, etc., the use of the bridge strap 100 or 112 provides a circuit connection from the second electrode 32 to the fourth electrode 36.

Figure 10:
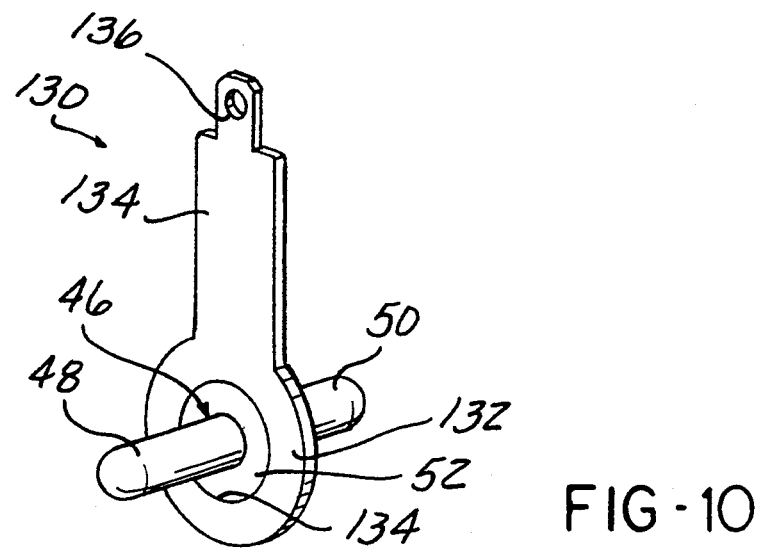
FIG. 10 is a perspective view of an alternate connector having a voltage tap mounted thereon.

As shown in FIG. 10, a voltage tap denoted generally by reference number 130 may be mounted on the connector 46 to provide a voltage monitoring point between two adjacent, interconnected modules 12, 14, etc. The voltage tap 130 is, by way of example only, in the form of a planar strip which is formed of an electrically conductive material, such as copper. The voltage tap 130 has an annular first end portion 132 with a central aperture 134 which fixedly receives the collar 52 of the connector 46 to mount the voltage tap 130 on the connector 46. A linear portion 134 extends from the annular first end portion 132 and terminates in an end connector 136 which is preferably in the form of a male spade. Alternately, the end connector 136 may be in the form of a female-type connector. Further, the end connector 136 is preferably covered with electrical insulation, not shown.

The voltage tap 130 is provided in a sufficient length such that when the connector 46 is interconnected between the connectors and electrodes of two adjacent modules 12, 14, etc., the end connector 136 will extend slightly above the exterior surface of the two modules 12, 14, etc. A suitable connector may be attached to the end connector 136 to monitor the voltage of the interconnected modules 12, 14, etc.

It should be noted that while the voltage tap 130 may be mounted on any connector 46, it is preferred that the voltage tap 130 be mounted on the connector 46 interconnected between the second and first connectors 32 and 30, respectively, of two adjacent disposed modules 12, 14, etc.

As shown in FIG. 6, the voltage tap 130 may also be mounted on one of the connectors 46 mounted in the planar carrier 74. In this mounting arrangement, the voltage tap 130 may be situated alongside the exterior surface of the planar carrier 74, with the end connector portion 136 extending above the top surface of the carrier 74. Alternately, the voltage tap 136 may be disposed within the carrier 74, such as during the molding of the carrier 74, so as to be completely surrounded by the carrier 74 which provides insulation for the voltage tap 130.

FIG. 6 also depicts an optional use of a temperature measuring means 140. The temperature measuring means 140 is preferably a thermocouple 142 which may be in the form of an annular disk mounted on one surface of the carrier 74 or directly molded within the carrier 74. The thermocouple disk 142 has at least one exposed face opening outward from the carrier 74 to contact an adjacent surface of one of the modules 12, 14, etc. In this manner, the thermocouple 140 senses the temperature of the module and provides an output signal on wires 144 proportional to the sensed temperature. This temperature indication is particularly useful in heavy battery modules usage or during charging of the battery modules.

Further, when a number of identical battery modules 12, 14, etc., are co-axially interconnected by use of appropriate connectors 46, etc., a single bridge strap 100 or 112 may be inserted into the endmost module, such as module 14 shown in FIG. 1, to provide a series connection between the second electrode 32 on the endmost module 14 through each of the intervening modules to the fourth electrode 36 on the opposite endmost module 12.

The use of the bridge strap 100 or 112 provides a unique feature for the present battery construction. The bridge strap 100 or 112 provides safety during the assembly of a number of battery modules 12, 14, etc., since there is no electrical circuit path through the interconnected battery modules 12, 14, etc., until the bridge strap 100 or 112 is inserted into the endmost module. This provides safety for the installer, both during assembly and disassembly of the battery modules. In addition, although not shown in FIG. 1, suitable biasing means or resilient mounting means may be employed with each bridge strap 100 or 112 to provide for automatic release of the bridge strap 100 or 112 from the battery module 14 to which it is connected in the event of sufficient external loads, such as might occur during a vehicle collision. Under such loads, the bridge strap 100 or 112 would automatically separate from the endmost battery module thereby breaking the circuit between the battery modules and preventing the exposure of electrical potential to the occupants of the vehicle.

Figure 9:
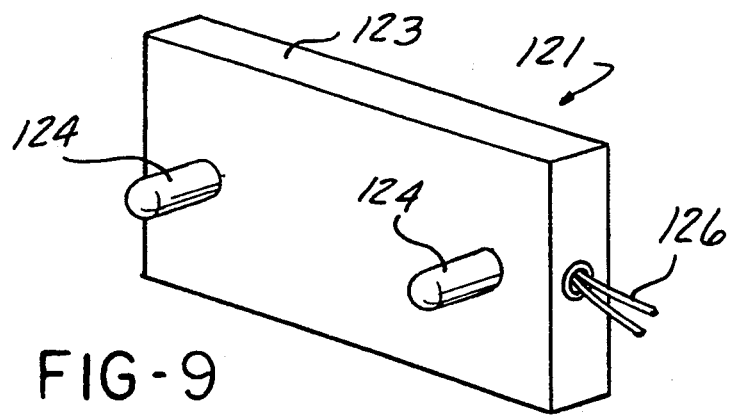
FIG. 9 is a perspective view of another embodiment of a jumper means used in the battery of the present invention.

An alternate embodiment of a bridge strap 121 is shown in FIG. 9. In this embodiment, the bridge strap 121 comprises a suitably formed housing 123 which has a pair of connectors 124 mounted on and extending outward therefrom. The connectors 124 may be similar to the male pins 104 and 106 on the bridge strap 100 shown in FIG. 1 or the female sockets 120 and 122 on the bridge strap 112 shown in FIG. 5, depending upon the corresponding electrode shape of the battery module into which the bridge strap 121 is to be inserted. The housing 123 can contain suitable devices to act as a voltage break-down access point. An electrical overload protector, such as a fuse, circuit breaker, etc., or a thermal overload protector, may be mounted within the housing 123 to provide safety for the battery 10. In addition, an intelligent safety switch, such as the switch disclosed in my co-pending application, Ser. No. 08/139,505, for a HIGH AMPERAGE, HIGH EFFICIENCY ELECTRICAL SWITCH, may also be mounted within the housing 123. The contents of this application are incorporated herein in their entirety.

Any overload protector, such as a circuit breaker, mounted within the housing 123 may be provided with an external switch. In addition, the overload protector device may be remotely controlled by means of signals provided from an external control source over leads 126 to the overload protective device mounted within the housing 122.

Finally, as shown in FIG. 1, suitable leads, 128 and 129, such as male pins, in the case of female connectors 30 and 36, are used to connect the battery 10 to a load, such as an electrical bus of an electrically powered vehicle.

Figure 11:
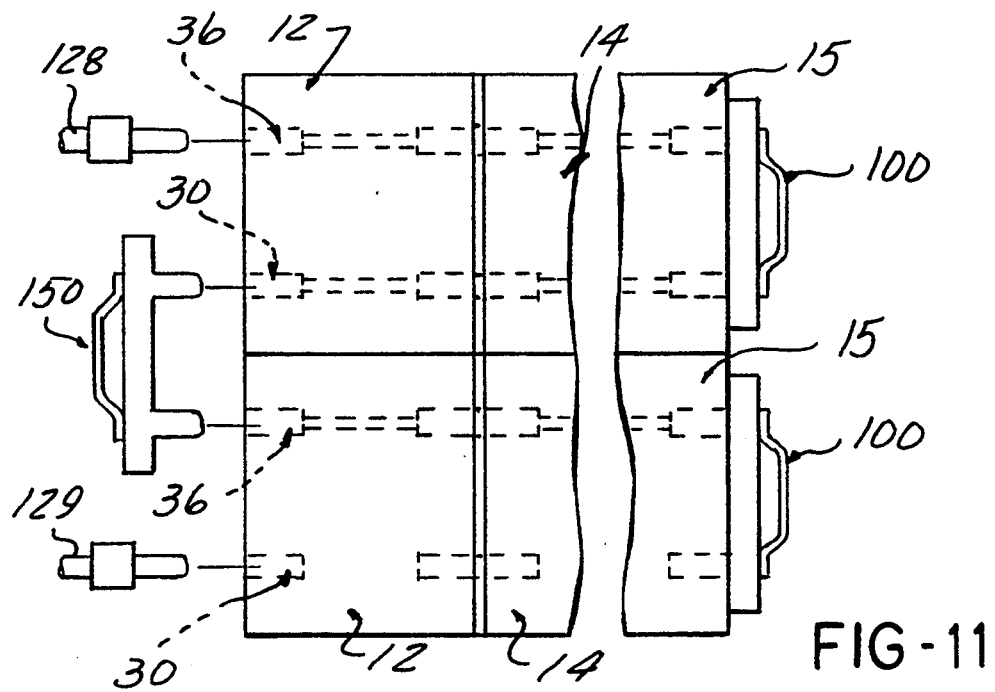
FIG. 11 is a plan view of side-by-side arranged and interconnected batteries of the present invention.

As shown in FIG. 11, any number of like modules 12, 14, 15, etc., may be interconnected by the various connectors and end jumpers 100 of the present invention to form a series connected, axially-aligned row of modules. A similar axial arrangement of series connected modules may also be disposed side-by-side with the first row of modules as shown in FIG. 11. The modules 12, 14, 15, etc., in the second row are also interconnected by connectors and the end jumpers 100 in the same manner as described above. However, in this embodiment, an elongated jumper, similar to jumper 100 may be used to interconnect the fourth connector 36 of the module 12 in one axial arrangement of interconnected modules 12, 14, etc., with the first connector 30 of the module 12 in the adjacent, side-by-side disposed axial arrangement of like interconnected modules. The jumper 150 serially interconnects all of the modules in the two side-by-side axial interconnected arrangements of modules to form one large battery. Suitable leads 128 and 129 may be used to connect the first electrode 30 in the module 12 in one row and the fourth electrode 36 in the module 12 in the adjacent row of modules to an electrical bus, load, etc.

In summary, there has been disclosed a unique battery formed of a plurality of interconnected modules which is ideally suited for use in electrically-powered automotive vehicles. Each module includes a second pair of electrodes which are interconnected internally through the casing of the module by an electrical conductor. A bridge strap or jumper mountable in an endmost one of an aligned number of interconnected modules connects the normal active electrodes of each module to the second pair of electrodes and conductor within each module to complete an electrical current path through the interconnected modules. The battery of the present invention is easily assembled and disassembled. In addition, by utilizing female-type electrodes, exposed electrode surfaces are minimized thereby reducing the exposure to short circuits or damage to such electrodes while still providing ease of interconnection and disconnection of the individual modules.

What is claimed is:

1. A battery comprising:
   a case containing electroactive material, the case formed with a plurality of exterior walls;
   a first connector mounted in one exterior wall of the case and electrically connected to the electroactive material in the case to form a first positive electrode;
   a second connector mounted in an external wall of the case and electrically connected to the electroactive material in the case to form a second negative electrode;
   electrical conductor means, mounted in the case, and extending between external walls of the case, for forming a conductive path through the case;
   third and fourth connectors, mounted on the case and connected to opposite ends of the electrical conductor means; and
   jumper means, insertable into the second and third connectors for electrically connecting the second connector through the electrical conductor means in the case to the fourth connector.

2. The battery of claim 1 wherein:
   the first connector and the fourth connector are mounted on one external wall of the case; and
   the second connector and the third connector are mounted on another external wall of the case.

3. The battery of claim 1 further comprising:
   connector means for releasably interconnecting the second connector and the third connector of one battery to the first connector and fourth connector, respectively, of an adjacent disposed battery.

4. The battery of claim 3 wherein:
   the first, second, third and fourth connectors comprise female connectors; and wherein
   the connector means comprises a separate connector including co-axial male pins releasably insertable into one of the co-axially aligned first and second connectors and the third and fourth connectors of two adjacent disposed batteries.

5. The battery of claim 3 wherein the separate connector means further comprises:
   a pair of separate connectors, each including a pair of oppositely extending connector portions; and a carrier;

the pair of separate connectors fixedly mounted on and extending outward from outside sides of the carrier.

6. The battery of claim 5 wherein:

the carrier has a planar shape with two exposed major exterior surfaces.

7. The battery of claim 5 wherein the carrier further comprises:

guide means, formed on the carrier, for engaging and guiding two adjacent disposed batteries into alignment when the carrier is mounted between the two adjacent disposed batteries.

8. The battery of claim 1 wherein the first and second connectors are co-axially mounted in the case.

9. The battery of claim 1 wherein:

one pair of the first connector and the fourth connector, and the second connector and the third connector are female and the other pair of first connector and the fourth connector, and the second connector and the third connector are male; and the jumper means has connector portions complimentary to the male connectors.

10. The battery of claim 1 wherein the jumper means comprises:

an electrical conductor;

a pair of connectors electrically connected to and mounted on the electrical conductor.

11. The battery of claim 10 wherein the jumper means further comprises:

handle means, mounted on the electrical conductor, for facilitating insertion and removal of the jumper means with respect to the second and third connectors.

12. The battery of claim 3 wherein:

the connector means are fixedly mounted in the first and fourth connectors, and the second and third connectors.

13. The battery of claim 3 further comprising:

voltage monitoring means, attached to the connector means and extending outwardly from the case, for providing a battery voltage monitoring tap.

14. The battery of claim 13 wherein the voltage monitoring means comprises:

a planar strip having a first end portion fixedly mounted to the connector means; and an elongated second portion integrally extending from the first end portion and terminating in an end connector.

15. The battery of claim 5 further comprising:

voltage monitoring means attached to the connector means on the carrier and extending outwardly from the carrier, for providing a battery voltage monitoring tap.

16. The battery of claim 15 wherein the voltage monitoring means comprises:

a planar strip having a first end portion fixedly mounted to the connector means; and an elongated second portion integrally extending from the first end portion and terminating in an end connector.

17. The battery of claim 5 further comprising:

temperature monitoring means, mounted on the carrier and contacting the case adjacent to the carrier, for providing an output signal proportional to the temperature of the case.

18. The battery of claim 17 wherein the temperature monitoring means comprises:

a thermocouple mounted on the carrier.

19. A battery comprising:

at least two modules, each module including:

a case containing electroactive material, the case formed with a plurality of exterior walls;

a first connector mounted in one exterior wall of the case and electrically connected to the electroactive material to form a first positive electrode;

a second connector mounted in one exterior wall of the case and electrically connected to the electroactive material to form a second negative electrode;

a third and a fourth connector mounted in an exterior wall of the case and spaced from the first and the second connector, respectively;

an electrical conductor disposed in the case and electrically connected to the third and fourth connectors;

means for electrically connecting the second and third connectors of one module to the first and fourth connectors of an adjacent disposed module; and jumper means, mountable in the second and third connectors of an endmost one of a plurality of interconnected modules, for electrically connecting the second connector of the endmost module in series with the fourth connector of the opposite endmost module.

20. The battery of claim 19 wherein:

the first connector and the fourth connector are mounted on one external wall of the case; and the second connector and the third connector are mounted on another external wall of the case.

21. The battery of claim 19 further comprising:

connector means for releasably interconnecting the second connector and the third connector of one module to the first connector and fourth connector, respectively, of an adjacent disposed module.

22. The battery of claim 21 wherein:

the first, second, third and fourth connectors comprise female connectors; and wherein the connector means comprises a separate connector including co-axial male pins releasably insertable into one of the co-axially aligned first and second connectors and the third and fourth connectors of two adjacent disposed modules.

23. The battery of claim 21 wherein the separate connector means further comprises:

a pair of separate connectors, each including a pair of oppositely extending connector portions; and a carrier;

the pair of separate connectors fixedly mounted on and extending outward from outside sides of the carrier.

24. The battery of claim 22 further comprising:

voltage monitoring means attached to the connector means and extending outwardly from the case, for providing a battery voltage monitoring tap.

25. The battery of claim 24 wherein the voltage monitoring means comprises:

a planar strip having a first end portion fixedly mounted to the connector means; and an elongated second portion integrally extending from the first end portion and terminating in an end connector.

26. The battery of claim 23 further comprising:

voltage monitoring means attached to the connector means on the carrier and extending outwardly from the carrier, for providing a battery voltage monitoring tap.

27. The battery of claim 26 wherein the voltage monitoring means comprises:
a planar strip having a first end portion fixedly mounted to the connector means; and
an elongated second portion integrally extending from the first end portion and terminating in an end connector.

28. The battery of claim 23 further comprising:
temperature monitoring means, mounted on the carrier and contacting the case of a battery disposed adjacent to the carrier, for providing an output signal proportional to the temperature of the case.

29. The battery of claim 28 wherein the temperature monitoring means comprises:
a thermocouple mounted on the carrier.

30. The battery of claim 23 wherein:
the carrier has a planar shape with two exposed major exterior surfaces.

31. The battery of claim 23 wherein the carrier further comprises:
guide means, formed on the carrier, for engaging and guiding two adjacent disposed modules into alignment when the carrier is mounted between the two adjacent disposed modules.

32. The battery of claim 31 wherein the first and second connectors are co-axially mounted in the case.

33. The battery of claim 19 wherein:
one pair of the first connector and the fourth connector, and the second connector and the third connector are female and the other pair of first connector and the fourth connector, and the second connector and the third connector are male; and
the jumper means has connector portions complimentary to the male connectors.

34. The battery of claim 19 wherein the jumper means comprises:
an electrical conductor;
a pair of connectors electrically connected to and mounted on the electrical conductor.

35. The battery of claim 34 wherein the jumper means further comprises:
handle means, mounted on the electrical conductor, for facilitating insertion and removal of the jumper means with respect to the second and third connectors.

36. The battery of claim 21 wherein:
the connector means are fixedly mounted in the first and fourth connectors, and the second and third connectors.

37. The battery of claim 1 wherein the jumper means further comprises:
controllable electrical switch means, mounted in the jumper means, for opening the electrical connection through the jumper means.

38. The battery of claim 13 wherein the jumper means further comprises:
controllable electrical switch means, mounted in the jumper means, for opening the electrical connection through the jumper means.

* * * * *